United States Patent
Rouse et al.

(10) Patent No.: US 7,102,745 B2
(45) Date of Patent: Sep. 5, 2006

(54) AUTOMATED OPTICAL INSPECTION OF WIRE-WRAPPED WELL SCREENS

(75) Inventors: William T. Rouse, Montgomery, TX (US); Richard Grifno, Woodlands, TX (US); Arthur T. Parmely, Katy, TX (US)

(73) Assignee: Weatherford/Lamb, Inc., Houston, TX (US)

( * ) Notice: Subject to any disclaimer, the term of this patent is extended or adjusted under 35 U.S.C. 154(b) by 300 days.

(21) Appl. No.: 10/463,238

(22) Filed: Jun. 17, 2003

(65) Prior Publication Data

US 2004/0258293 A1    Dec. 23, 2004

(51) Int. Cl.
G01N 21/00    (2006.01)
G01B 11/28    (2006.01)

(52) U.S. Cl. .................................. 356/238.2; 356/630
(58) Field of Classification Search ............. 356/238.1, 356/238.2, 238.3, 630–632; 348/141; 29/407.04, 29/896.61

See application file for complete search history.

(56) References Cited

U.S. PATENT DOCUMENTS

| | | | |
|---|---|---|---|
| 4,843,808 A | * | 7/1989 | Ruge et al. .................... 57/264 |
| 4,866,289 A | * | 9/1989 | Kawamura et al. .... 250/559.22 |
| 4,914,514 A | | 4/1990 | Smith et al. |
| 4,922,337 A | * | 5/1990 | Hunt et al. .................... 348/88 |
| 5,315,366 A | | 5/1994 | Inada et al. |

FOREIGN PATENT DOCUMENTS

GB    2 221227    1/1990

OTHER PUBLICATIONS

U.K. Search Report, Application No. GB0413617.2, dated Oct. 18, 2004.
Slots, Satimage, Industrial Machine Vision Systems, Data Sheet.
Slots, Satimage, Industrial Machine Vision Systems, Inspection of Slots.

* cited by examiner

Primary Examiner—Hoa Q. Pham
(74) Attorney, Agent, or Firm—Patterson & Sheridan, LLP

(57) ABSTRACT

Methods and systems for automatically inspecting a wire-wrapped well screen are provided. A camera may capture an image of a portion of the screen including at least two facing edge portions of adjacent wraps of wire defining a slot therebetween. A thickness of the slot may be determined based on the image, for example, by calculating a distance between the facing edge portions. The camera may be moved relative to the screen to measure slot thickness at several sample locations along a length of the screen. The screen may also be rotated relative to the camera to measure slot thickness at sample locations at different angular offset locations around the screen. Slot thickness measured at the sample locations may be analyzed to generate an inspection report that could be supplied to a customer with the well screen.

22 Claims, 4 Drawing Sheets

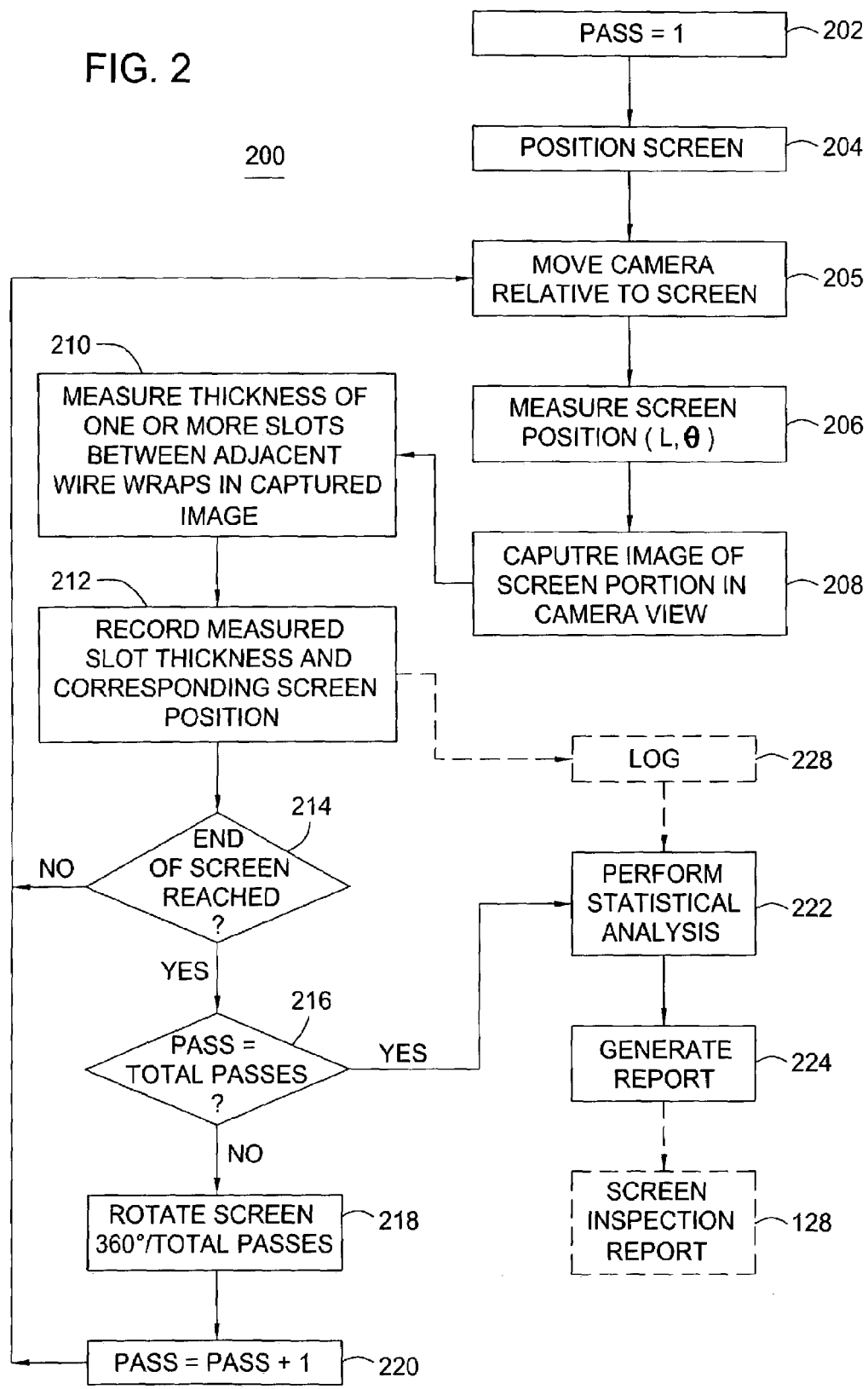

228

| LENGTH = 15ft. | | DIAM = 3" | | SLOT SIZE = .01" |
|---|---|---|---|---|
| L | PASS 1 ($\theta = 0°$) | PASS 2 ($\theta = 90°$) | PASS 3 ($\theta = 180°$) | PASS 4 ($\theta = 270°$) |
| 1" | .0098" | .0098" | .0099" | .0099" |
| 2" | .0099" | .0100" | .0101" | .0102" |
| 3" | .0103" | .0102" | .0101" | .0100" |
| ... | | | | |
| 179" | .0099" | .0099" | .0098" | .0098" |
| 180" | .0098" | .0097" | .0097" | .0096" |

AUTOMATED OPTICAL INSPECTION OF WIRE-WRAPPED WELL SCREENS

BACKGROUND OF THE INVENTION

1. Field of the Invention

Embodiments of the present invention generally relate to well screens and more particularly to inspection of slot thickness between adjacent wraps of wire on wire-wrapped well screens.

2. Description of the Related Art

In the drilling of oil and gas wells, a wellbore is formed in a formation and typically lined with a string of steel pipe commonly referred to as casing. In a process generally referred to as well completion, a string of tubular elements and various pieces of equipment required to enable safe and efficient fluid production are assembled downhole, often within the casing. As part of the well completion process, the casing is typically perforated to allow fluids to flow from an adjacent portion of the formation into the wellbore. In many cases, these formation fluids include undesirable particles, such as sand, that may result in inefficient production if not screened from the production flow.

Producing sand along with well fluids can result in premature failure of production equipment (e.g., artificial lift equipment). Further, collections of sand (sand bridges) formed in the casing or tubulars may impede and eventually obstruct flow of the production fluids. Sand production may also cause erosion or compaction of the surrounding formation which may lead to casing failure. Casing failure in or around a producing zone may lead to loss of the well. Therefore, the control of sand flow from formations is one of the most critical problems in well completion. In some cases, to control sand, a well screen is placed in the wellbore and the surrounding annulus is packed with gravel of a specific size designed to prevent the passage of formation sand into the production flow. The primary objective of this "gravel pack" is to prevent the flow of formation sand, while causing minimal impairment to well productivity.

One type of well screen commonly used for gravel pack applications, as well as stand-alone sand control applications, is a wire-wrapped well screen. A wire-wrapped well screen is typically formed by helically wrapping wire having a controlled profile around a length of perforated base pipe. The thickness of the continuous slot formed between adjacent wraps of the wire is controlled to be small enough to retain the gravel placed behind the screen (or any material to be screened from the production fluid), yet minimize any restriction to flow of the production fluid. Therefore, it is highly desirable that the thickness of this slot (commonly referred to as the slot gauge) be maintained as uniform as possible. Wire-wrapped well screens may be relatively long (often several tens of feet), while the wrapped wire and slot thickness may be relatively small (often less than 0.1 inches and 0.01 inches, respectively). Thus, current processes for manufacturing wire-wrapped well screens yield a product with tens of thousands of slots (i.e., portions of the continuous slot between adjacent wire wraps) to inspect.

Despite the fact that the thickness of slots between adjacent wire wraps may be the most critical attribute of a wire-wrapped screen, the large number of slots makes inspecting each slot economically impractical using conventional measurement techniques. For example, conventional inspection techniques include manually sliding a feeler gauge (e.g., a metal leaf of a known thickness) into the slot or manually using an optical scope to measure slot thickness, both of which are time consuming and prone to human error. To save time, a relatively small set of sample slots may be measured and statistical techniques may be applied to determine an average slot thickness, minimum/maximum slot thickness, and the like. However, the relatively small set of sample slots may be insufficient as there may be relatively long sections of the continuous slot between slot samples that are not inspected.

Accordingly, what is needed is an improved method for inspecting wire-wrapped screens to measure slot thickness between adjacent wire wraps, preferably, an automated system that allows for faster inspection than conventional manual inspection techniques.

SUMMARY OF THE INVENTION

The present invention generally provides methods and systems for automatic inspection of wire-wrapped well screens.

One embodiment provides a method for inspecting a wire-wrapped screen. The method generally includes: (a) moving a camera to a location along a length of the screen; (b) capturing an image of a portion of the screen, the image including at least one slot defined by facing edge portions of adjacent wraps of wire; (c) determining a thickness of the slot, based on the image; and (d) repeating the operations (a)–(c) to determine the thickness of slots at a plurality of locations along the length of the screen.

Another embodiment provides another method for inspecting a wire-wrapped screen. The method generally includes capturing an image of a portion of the screen, the image including at least two facing edge portions of adjacent wraps of wire defining a slot therebetween, and calculating a thickness of the slot, based on the image. For some embodiments, the method may be performed during manufacturing operations and may further include determining if the calculated slot thickness falls outside a predetermined range of acceptable slot thickness and, if so, halting the manufacturing process.

Another embodiment provides a system for inspecting a wire-wrapped screen generally including at least one camera, a screen holding member, camera moving means for moving the at least one camera relative to the screen holding member, and a computer system. The computer system is configured with a screen inspection program configured to perform operations generally including: (a) moving, via the camera moving means, the at least one camera to a location along a length of the screen, (b) capturing an image of a portion of the screen, the image including at least two facing edge portions of adjacent wraps of wire defining a slot therebetween, (c) determining a thickness of the slot, based on the image, and (d) repeating the operations (a)–(c) to determine the thickness of slots at a plurality of locations along the length of the screen.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 2 illustrates exemplary operations for optical inspection of a screen in accordance with embodiments of the present invention.

DETAILED DESCRIPTION OF THE PREFERRED EMBODIMENT

Figure 1A:
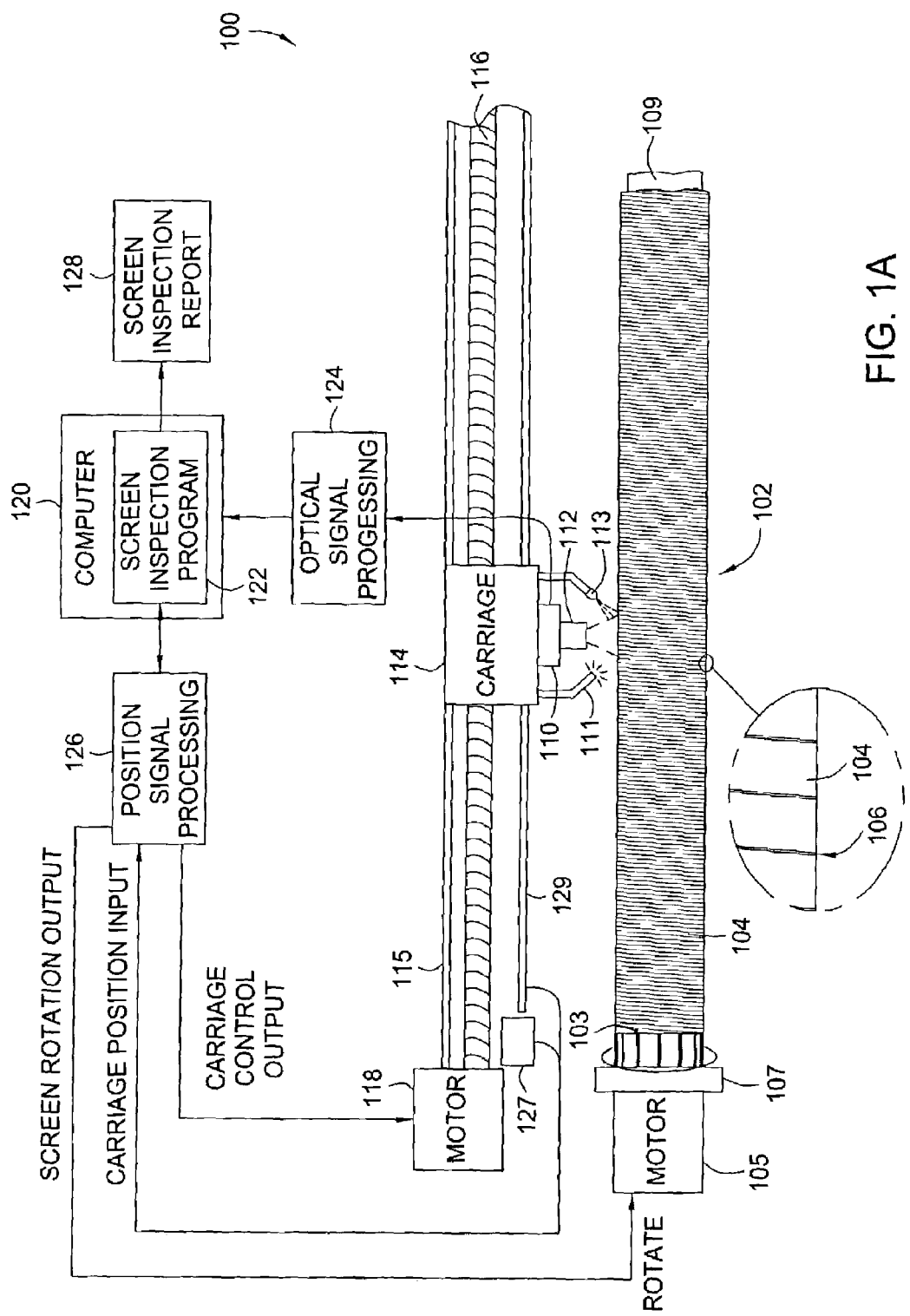
FIG. 1A illustrates an exemplary screen inspection system in accordance with embodiments of the present invention.

In contrast to the manual inspection techniques of the prior art, embodiments of the present invention provide methods and systems for automatically inspecting slot thickness of a wire wrapped well screen. For one embodiment, a camera may capture an image of a portion of a wire wrapped well screen including at least one slot between adjacent wraps of wire. The image may be fed into optical signal processing circuitry in communication with a computer configured to measure a thickness of the slot, based on the image. The camera may be moved relative to the screen to measure slot thickness at several sample locations along a length of the screen.

Thus utilizing high speed signal processing, embodiments of the present invention may allow for more thorough inspection in less time than conventional manual inspection techniques. Of course, while embodiments of the present invention are described below with reference to inspection of wire-wrapped well screens, it will be clear to one skilled in the art that the systems and techniques described herein may also be utilized to automatically inspect various other types of manufactured articles having components, such as slots formed therein, with a critical thickness.

One embodiment of the invention is implemented as a program product for use with a computer system such as, for example, the computer system 120 of the screen inspection system 100 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications and the Internet. In general, the routines executed to implement the embodiments of the invention, may be part of an operating system or a specific application, component, program, module, object, or sequence of instructions, embodied, for example, as a screen inspection program 122, an optical signal processing component 124, and/or a position signal processing component 126, of the screen inspection system 100.

An Exemplary Inspection System

FIG. 1 illustrates the major hardware and software components of an exemplary screen inspection system 100 for inspecting a wire-wrapped screen 102 in accordance with embodiments of the present invention. The system 100 may be utilized to automatically inspect slots 106 formed between adjacent wraps of wire 104 of the screen 102. As illustrated, the system 100 may include at least one camera 110 with a lens 112 positioned to have a field of view that includes at least portions of adjacent wraps of wire 104 defining a slot 106 therebetween.

The camera 110 may be any suitable camera, such as a well known charge-coupled-device (CCD) camera, capable of capturing an image of the field of view with sufficient resolution (commonly measured in megapixels: 1024×1024=1 Megapixel, 4096×4096=16 Megapixels, etc.) to allow for the measurements described herein. The camera 110 may output the captured image to optical signal processing component 124, which may include any suitable combination of hardware and software to receive the image and process the image to a format suitable for use by the screen inspection program 122.

While the camera 110 is arbitrarily shown as being positioned above the screen 102 (e.g., 90° from horizontal), for some embodiments, the camera 110 (or at least the lens 112) may be positioned below the screen 102, beside the screen 102 or any other angular orientation about the screen 102. Further, while the screen 102 is shown in a horizontal position, which may be advantageous for practical matters (as the screen 102 may be several tens of feet long), for some embodiments, the screen 102 may be positioned at any other angle from horizontal.

In either case, the screen inspection program 122 is typically configured to impart relative motion between the camera 110 and screen 102 to measure slot thickness at several locations along a length of the screen 102. Any suitable means may be utilized to impart relative motion between the camera 110 and the screen 102. While it may be possible to move the screen 102 (e.g., by moving a screen holding member 107 on which the screen 102 is mounted) while holding the camera 110 stationary, a relatively large inspection area would be required due to the potential length of the screen 102.

Therefore, it may be preferable to instead move the camera 110, and any suitable means may be utilized to move the camera 110. As an example, for one embodiment, the camera 110 may be mounted to a carriage 114 that moves along a track 115 in response to rotating motion of a ball screw 116. The ball screw 116 may be driven by a motor 118, which may be controlled by the computer 120 via a signal generated by a position signal processing component 126.

The computer 120 may also determine, via the position signal processing component 126, a position of the camera 110 via a signal generated by a position sensor, such as a rotary encoder 127 or linear encoder 129. In other words, to move the camera 110 to a desired location, the computer 120 may, via the position signal processing component 126, generate signals to move the carriage 114 while monitoring signals indicative of the position of the carriage 114. As described below, the measured position of the camera 110 relative to the screen 102 may be used to identify a location of a measured slot 106 along the screen 102.

While shown as separate components, either or both of the optical signal processing component 124 and position signal processing component 126 may be integrated with the computer 120. For example, the optical signal processing component 124 may be implemented as a bus interface card configured to capture images form the camera 110, while the position signal processing component 126 may be implemented as an industrial I/O card with inputs suitable for reading encoder signals and outputs suitable for controlling motors.

Exemplary Screen Inspection Operations

Operation of the various components of the screen inspection system 100 may best be described with reference to FIG. 2, which illustrates exemplary operations 200 that may be performed, for example, by the computer 120, as part of the screen inspection program 122. However, it should be noted that the components shown in FIG. 1 are not limited to the operations 200 of FIG. 2. Further, for some embodiments, the operations 200 may be performed by components other than those shown in FIG. 1.

For some embodiments, the operations 200 may be performed in multiple passes to take slot thickness measurements at several locations along the length of the screen 102, with the sample locations in each pass offset by some angle along the circumference of the screen 102. For example, prior to each successive pass, the screen 102 may be rotated by $360/N_{TOTAL\_PASSES}$, where $N_{TOTAL\_PASSES}$ is the total number of inspection passes, so that the sample location sets are evenly spaced. As an example, if an inspection consists of 4 passes, the screen 102 may be rotated 90° (360°/4) prior to each successive pass.

Accordingly, the operations 200 may begin at step 202, by setting a counter that tracks the number of inspection passes to 1. At step 204, the screen 102 is positioned, for example, in the holding member 107. Steps 205–214 represent a loop of operations to be iteratively performed as the camera 110 is moved relative to the screen 102.

At step 205, the camera 110 is moved relative to the screen 102, and, at step 206, a position of the camera 110 relative to the screen 102 is measured. For example, initially, the camera 110 may be brought to an arbitrary starting position (e.g., L=0) along a length the screen, while in subsequent iterations, the camera 110 may be moved along the length of the screen 102 in incremental steps. The length and number of the incremental steps per pass (as well as the number of passes) may be chosen in an effort to ensure a sufficient number of sample measurements are taken, without unduly increasing the total inspection time.

Figure 1B:
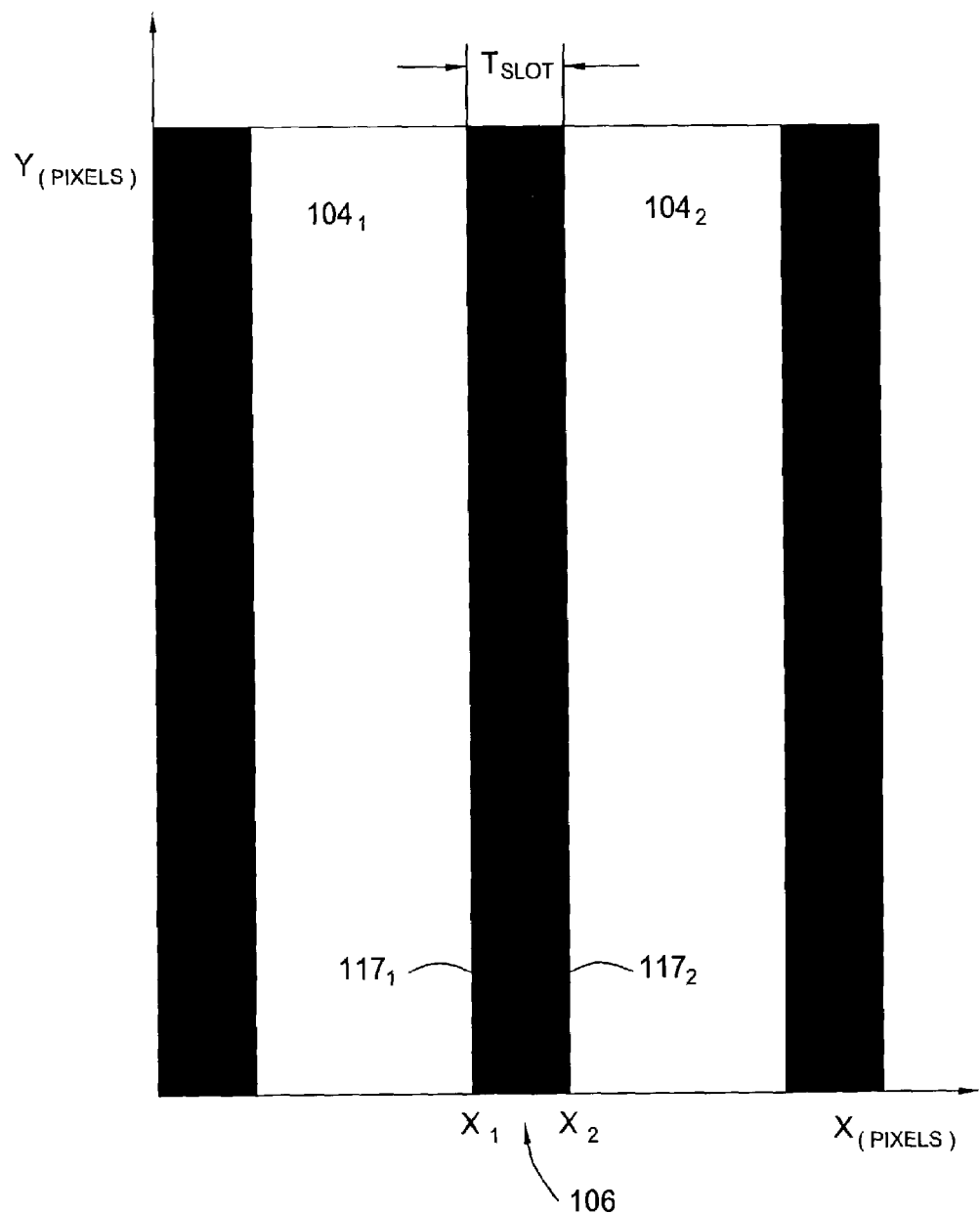
FIG. 1B illustrates an exemplary captured image of a screen for use by the screen inspection system.

At step 208, an image of the field of view of the camera 110 is captured. At step 210, a thickness of one or more slots 106 between adjacent wraps of wire 104 in the captured image is measured. Any suitable technique may be used to derive a slot thickness from the captured screen image. For example, as illustrated in FIG. 1B, a portion of the screen 102 may be captured as a 2-dimensional (e.g., with X-Y coordinates) set of pixels, and the slot thickness may be measured using edge detection.

As illustrated, a slot 106 may be defined by a first edge $117_1$ of a first wrap of wire $104_1$ and a second edge $117_2$ of a second wrap of wire $104_2$. The edges 117 may be readily detected due to a sharp change in color of the image when going from the relatively bright wire 104 (typically made of highly stainless steel) to the relatively dark slot 106. However, for some embodiments, in an effort to increase contrast between the wire 104 and the slots 106 formed therein, a dark colored sleeve 109 (e.g., constructed of a light absorbing material) may be inserted within the screen 102. As an alternative (e.g., if the wire 104 is relatively dark in color), a sleeve 109 having a lighter color than the wire 104 may be used. Further, for some embodiments, in an effort to increase contrast between the wire 104 and slots 106, a light source 111 may be utilized to illuminate the screen 102.

In either case, the first edge $117_1$ may be detected at a first pixel location (X1) along the X axis, while the second edge $117_2$ may be detected at a second pixel location (X2) along the X axis. The thickness of the slot 106 may then be determined based on the difference between pixel locations (X2−X1), and a scaling factor that represents a linear unit occupied by each pixel (e.g., inches/pixel). As a simple example, if the camera 110 captures a 0.4"×0.4" portion of the screen 102, as a 2 dimensional image of 4096×4096 pixels, the scaling factor would be approximately 0.0001 inches/pixel. Therefore, a slot 106 defined by edges $117_1$ and $117_2$ spaced apart by 100 pixels (e.g., X2−X1=100 pixels), would correspond to a slot thickness of approximately 0.01". For some embodiments, the (pixel) distance between adjacent edges $117_1$ and $117_2$ may be measured in more than one location along the Y axis and averaged, for example, to determine an average thickness of the slot 106.

At step 212, the measured slot thickness and corresponding screen position are recorded, for example, in a log 228 which may be later analyzed. At step 214, a determination is made (e.g., via signals from the rotary encoder 127 or linear encoder 129) as to whether the camera 110 has reached the end of the screen 102 (or at least the last position of the screen 102 to be sampled). If the end of the screen 102 has not been reached, processing returns to step 205 to move the camera 110 relative to the screen 102, to measure slot thickness at another sample location.

Figures 3A, 3B:
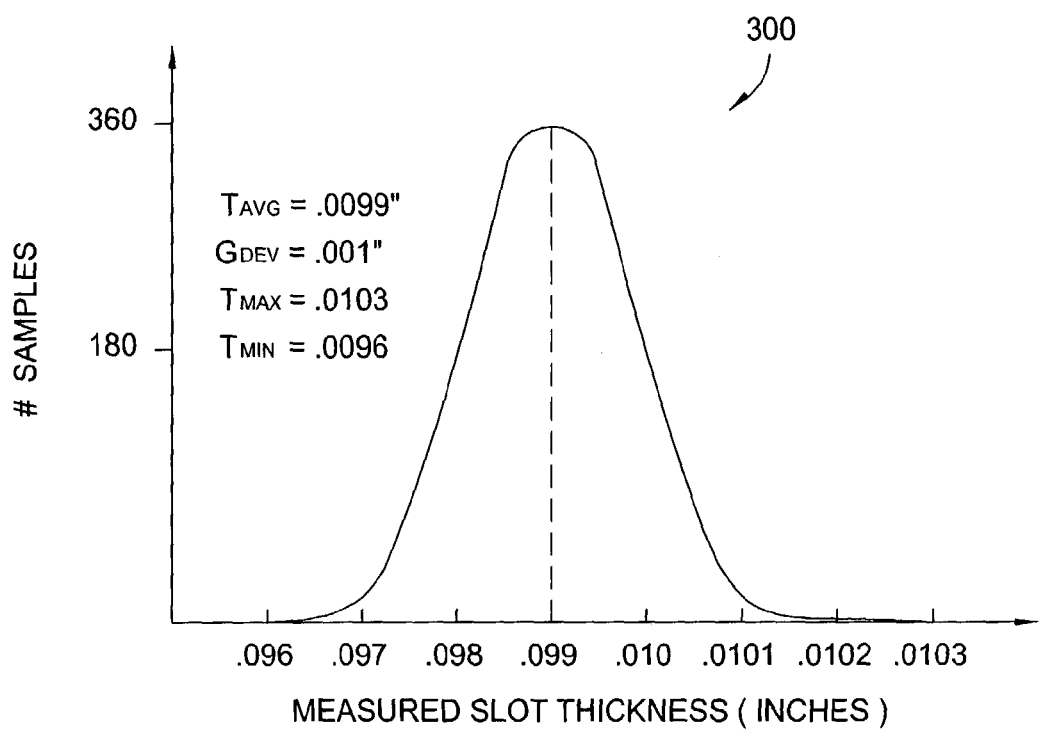
FIGS. 3A and 3B illustrate an exemplary log and bell curve, respectively, of measured slot thickness that may be generated in accordance with embodiments of the present invention.

On the other hand, if the end of the screen 102 is reached, processing proceeds to step 216, where a determination is made as to whether the current inspection pass is the final pass (e.g., pass_counter=total_passes). If not, the screen 102 is rotated. Accordingly, as illustrated in FIG. 3A, the log 228 may include, for each sample location, a set of thickness measurements, each taken in a different pass. In other words, the location, on the screen 102, of each sample in the log 228 may be identified by a length (L) and an offset angle (Θ). For example, the log 228 shows sample slot measurements taken in four successive passes, at offset locations of 0°, 90°, 180°, and 270°.

As illustrated in FIG. 1, rotation of the screen 102 may be accomplished by sending a signal to a motor 105 configured to rotate the screen holding member 107. For some embodiments, one or more reference marks 103 may be placed on the screen 102 (and/or the screen holding member 107) to indicate a rotational position of the screen 102. The screen inspection program 122 may be configured to detect the reference marks 103 as part of a captured image in order to determine position of the camera 110. For other embodiments, a position sensor (not shown), such as a rotary encoder may be positioned to provide a signal indicative of the angular position of the screen holding member 107.

In either case, once the screen is rotated, the operations 205–214 may be repeated to take slot thickness measurements at sample locations for another inspection pass. In an effort to reduce inspection time, the screen inspection program 122 may be configured to take sample slot thickness measurements while moving the camera 110 in different directions on successive inspection passes. For example, the camera 110 may travel from a first end to a second end during a first pass and, after the screen 102 is rotated, may travel from the second end to the first end during a second pass, thus avoiding moving the camera 110 the length of the screen 102 to return the camera to the same starting position for each pass.

For some embodiments, rather than rotate the screen 102 after each inspection pass, multiple cameras 110 at offset locations may be utilized. Further, for some embodiments, movement of the camera 110 may be synchronized with rotation of the screen 102, such that samples may be taken at offset locations around a circumference of the screen 102 in a single pass. In such embodiments, with an adequate image capture (sample) rate, it may be possible to measure the thickness of the entire continuous slot 106 running the length of the screen 102.

Once all the inspection passes have been performed, processing proceeds to step 222, where a statistical analysis is performed on the sample slot thickness measurements (e.g., recorded in the log 228) and, at step 224, the inspection report 128 is generated based on the statistical analysis. The statistical analysis may include any type of processing of the sampled measurements required to generate information to be included in the inspection report 128. Of course, the statistical analysis will likely include, at least, determination of a maximum measured slot thickness ($T_{MAX}$) and a minimum slot thickness ($T_{MIN}$). The statistical analysis may also include generation of a Bell curve 300, as shown in FIG. 3, along with calculation of a mean (average) thickness ($T_{MEAN}$) and standard deviation ($\sigma_T$) of the sampled thickness measurements. Of course, the log 228 and/or inspection report may also include various other information, such as screen information (product number, length, diameter, nominal slot thickness, etc.), a date/timestamp, and operator identification.

For some embodiments, rather than automatically generate an inspection report 128, a visual indication may be provided to an operator, for example, via a display device (not shown) connected to the computer 120. Further, for some embodiments, rather than generate an inspection report 128 after inspecting each screen 102, the recorded samples may saved, for example, in a database of logs 228, to be analyzed at a later time (e.g., periodically, or at the end of a production run), as part of an on-going maintenance and/or quality process. For example, statistical analysis may be performed on several logs 228 of sampled thickness measurements generated before and after making adjustments to materials or manufacturing processes, in an effort to determine the effectiveness of such adjustments.

Further, depending on the implementation, the operations 200 may be performed "on-line" while a screen 102 is being fabricated (e.g., the camera 110 may be moved along a screen 102 as it is being rotated to wrap wire 104), or "off-line" on a completed product. In either case, for some embodiments, a determination may be made as to whether any of the sampled slot thickness measurements fall outside an acceptable criterion. The location (e.g., L, $\Theta$) of a sampled slot thicknesses found to be out of tolerance may optionally be recorded, for example, in the inspection report 128.

In some instances, it may be desirable to halt production upon determining a sampled slot thickness exceeds a threshold maximum allowable thickness ($T_{THRESH\_MAX}$), which may allow the screen 102 to pass particles that should be screened, or falls below a threshold minimum allowable thickness ($T_{THRESH\_MIN}$), which may restrict production flow through the screen 102. Sampled slot thickness outside the acceptable criteria (e.g., $T_{SAMP} > T_{THRESH\_MAX}$ or $T_{SAMP} < T_{THRESH\_MIN}$), referred to as a screen defect, may indicate a problem with materials or production equipment. Therefore, if such a screen defect is determined, manufacturing operations may be halted, for example, by sending a signal from the computer 120 to fabrication equipment (not shown), such as a wire-wrapping apparatus. Halting manufacturing operations when an unacceptable slot thickness is detected may prevent lost production time, as well as scrapped material.

As an alternative to, or in addition to, halting production, if a slot thickness within an inspected portion is found to be out of tolerance, the system 100 could be configured to mark the screen 102 at or near the inspected portion, using any suitable screen marking means. For example, the system 100 may be configured to mark the screen 102 with an ink, paint, dye, or other suitable marking material, deposited from a nozzle 113 under control of the screen inspection program 122. Of course, screen defects may be indicated by marking the screen 102 regardless of whether the inspection is performed during (on-line) or subsequent to (off-line) screen fabrication. In either case, such marking may facilitate the location of screen defects, for example, without having to rely on a recorded length and offset angle.

CONCLUSION

Embodiments of the present invention provide automatic inspection of slot thickness of a wire-wrapped screen. Through the utilization of high speed signal processing, slot thickness at a large number of sample locations along a wire-wrapped screen may be measured in a relatively short inspection time. Accordingly, embodiments of the present invention may allow for more thorough inspection in less time than conventional manual inspection techniques.

While the foregoing is directed to embodiments of the present invention, other and further embodiments of the present invention may be devised without departing from the basic scope thereof, and the scope thereof is determined by the claims that follow.

The invention claimed is:

1. A method for inspecting a wire-wrapped screen comprising:
    (a) moving a camera to a location along a length of the screen;
    (b) capturing an image of a portion of the screen, the image including at least one slot defined by facing edge portions of adjacent wraps of wire;
    (c) determining a thickness of the slot, based on the image;
    (d) repeating the operations (a)–(c) to determine the thickness of slots at a first plurality of locations along the length of the screen, wherein the first plurality of locations are at a single first angle along a circumference of the screen;
    (e) rotating the screen about its longitudinal axis subsequent to operation (d); and
    (f) repeating the operations (a)–(c) after rotating the screen to determine the thickness of slots at a second plurality of locations along the length of the screen, wherein the second plurality of locations are at a single second angle along the circumference of the screen that is offset from the first angle.

2. The method of claim 1, wherein determining a thickness of the slot comprises:
    detecting at least one pixel location along each of the facing edge portions; and
    calculating the slot thickness based on a difference in pixel locations detected along each of the at least two facing edge portions.

3. The method of claim 1, wherein:
    the camera is mounted to a carriage; and
    moving the camera comprises generating an output signal to control a motor that drives a ball screw coupled with the carriage.

4. The method of claim 1, further comprising, at each location, recording the determined slot thickness.

5. The method of claim 4, further comprising recording the location corresponding to each determined slot thickness.

6. The method of claim 4, further comprising performing statistical analysis of the recorded slot thicknesses.

7. The method of claim 6, wherein performing statistical analysis of the recorded slot thicknesses comprises calculating a maximum slot thickness and a minimum slot thickness.

8. The method of claim 7, further comprising generating an inspection report including at least the calculated maximum slot thickness and minimum slot thickness.

9. The method of claim 1, further comprising:
determining if a thickness of the slot within an inspected portion of the screen is outside a predetermined range; and
if so, physically marking the screen at or near the inspected portion.

10. A method for inspecting a wire-wrapped screen comprising:
moving a camera to different locations along a length of the screen;
capturing an image of a portion of the screen, the image including at least two facing edge portions of adjacent wraps of wire defining a slot therebetween;
calculating a thickness of the slot, based on the image;
determining if the calculated thickness is within a predetermined range; and
taking an action in response to determining the calculated thickness is outside the predetermined range, wherein determining a thickness of the slot comprises:
detecting at least one pixel location along each of the at least two facing edge portions; and
calculating the slot thickness based on a difference in pixel locations detected along each of the at least two facing edge portions.

11. The method of claim 10, wherein the capturing and calculating operations are performed during a manufacturing process for fabricating the screen.

12. The method of claim 11, wherein the action comprises halting the manufacturing process.

13. The method of claim 10, wherein the action comprises physically marking the screen at or near the slot.

14. The method of claim 10, wherein the capturing and calculating operations are performed during a manufacturing process for fabricating the screen.

15. A system for inspecting a wire-wrapped screen comprising:
at least one camera;
a screen holding member;
a camera moving assembly for moving the at least one camera along the screen; and
a computer system configured with a screen inspection program configured to perform operations comprising:
(a) moving, via the camera moving assembly, the at least one camera to a location along a length of the screen,
(b) capturing an image of a portion of the screen, the image including at least two facing edge portions of adjacent wraps of wire defining a slot therebetween,
(c) determining a thickness of the slot, based on the image, and
(d) repeating the operations (a)–(c) to determine the thickness of slots at a first plurality of locations along the length of the screen, wherein the first plurality of locations are at a single first angle along a circumference of the screen,
(e) rotating the screen about its longitudinal axis, and
(f) repeating the operations (a)–(c) after rotating the screen to determine the thickness of slots at a second plurality of locations along the length of the screen, wherein the second plurality of locations are at a single second angle along the circumference of the screen that is offset from the first angle.

16. The system of claim 15, wherein the camera moving means comprises a carriage and ball screw.

17. The system of claim 16, further comprising at least one encoder to generate a signal indicative of a location of the carriage along the ball screw.

18. The system of claim 15, further comprising a sleeve adapted to be inserted into the screen, wherein a color of the sleeve is chosen to contrast with a color of the wraps of wire.

19. The system of claim 15, wherein the operations further comprise:
recording the slot thickness determined at each location;
analyzing the recorded slot thicknesses; and
generating an inspection report based on the analyzed recorded slot thicknesses.

20. The system of claim 19, wherein the inspection report includes at least:
a maximum determined slot thickness; and
a minimum determined slot thickness.

21. A system for inspecting a wire-wrapped screen comprising:
at least one camera;
a screen holding member;
moving means for moving the at least one camera relative to the screen holding member;
a screen marking mechanism; and
a computer system configured with a screen inspection program configured to perform operations comprising:
(a) positioning, via the moving means, the at least one camera at a location along a length of the screen,
(b) capturing an image of a portion of the screen, the image including at least two facing edge portions of adjacent wraps of wire defining a slot therebetween,
(c) determining a thickness of the slot, based on the image.
(d) determining if the thickness of the slot falls within a specified range and, if not, generating a signal to mark the screen via the screen marking mechanism, and
(e) repeating the operations (a)–(d) to determine the thickness of slots at a plurality of locations along the length of the screen.

22. A method for inspecting a wire-wrapped screen comprising:
moving a camera to different locations along a length of the screen;
capturing an image of a portion of the screen, the image including at least two facing edge portions of adjacent wraps of wire defining a slot therebetween;
calculating a thickness of the slot, based on the image;
determining if the calculated thickness is within a predetermined range; and
taking an action in response to determining the calculated thickness is outside the predetermined range, wherein the action comprises physically marking the screen at or near the slot.

* * * * *